United States Patent
Zhu et al.

(10) Patent No.: US 8,744,357 B2
(45) Date of Patent: *Jun. 3, 2014

(54) MOBILE WIRELESS COMMUNICATIONS DEVICE HAVING NFC SENSOR AND MAGNETIC SENSOR AND ASSOCIATED METHODS

(75) Inventors: Lizhong Zhu, Waterloo (CA); Libo Zhu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 320 days.

This patent is subject to a terminal disclaimer.

(21) Appl. No.: 13/308,985

(22) Filed: Dec. 1, 2011

(65) Prior Publication Data

US 2013/0143486 A1 Jun. 6, 2013

(51) Int. Cl.
*H04B 7/00* (2006.01)

(52) U.S. Cl.
USPC .......... 455/41.2; 455/41.1; 455/410; 455/411; 340/568.1

(58) Field of Classification Search
CPC ........ H04B 1/38; H04W 76/02; H04W 76/04; H04W 88/02; H04L 65/1069
USPC ................... 455/41.2, 41.1, 410, 411, 562.1; 340/568.1, 572.1
See application file for complete search history.

(56) References Cited

U.S. PATENT DOCUMENTS

| | | | | |
|---|---|---|---|---|
| 8,249,500 | B2 * | 8/2012 | Wilson | 455/41.1 |
| 8,256,667 | B2 * | 9/2012 | Poznansky et al. | 235/380 |
| 8,340,577 | B2 * | 12/2012 | Griffin et al. | 455/41.2 |
| 8,463,186 | B2 * | 6/2013 | Griffin et al. | 455/41.2 |
| 2006/0079180 | A1 | 4/2006 | Sinivaara | |
| 2011/0070828 | A1 * | 3/2011 | Griffin et al. | 455/41.1 |
| 2013/0015956 | A1 * | 1/2013 | Wegelin et al. | 340/10.1 |
| 2013/0196596 | A1 * | 8/2013 | Parekh et al. | 455/41.1 |
| 2013/0281018 | A1 * | 10/2013 | Wilson | 455/41.1 |
| 2013/0303085 | A1 * | 11/2013 | Boucher et al. | 455/41.1 |
| 2013/0316647 | A1 * | 11/2013 | Leica et al. | 455/41.1 |

FOREIGN PATENT DOCUMENTS

| | | |
|---|---|---|
| EP | 1959332 | 8/2008 |
| EP | 2364004 | 9/2011 |

* cited by examiner

*Primary Examiner* — Minh D Dao
(74) *Attorney, Agent, or Firm* — Allen, Dyer, Doppelt, Milbrath & Gilchrist, P.A. Attorney at Law

(57) ABSTRACT

A mobile wireless communications device includes a near field communications (NFC) device, and a magnetic sensor. A processor is coupled to the NFC device and the magnetic sensor, and is switchable between an active mode and an idle mode based upon the magnetic sensor. The processor is configured to remain in the active mode based upon communication via the NFC device irrespective of the magnetic sensor.

20 Claims, 4 Drawing Sheets

MOBILE WIRELESS COMMUNICATIONS DEVICE HAVING NFC SENSOR AND MAGNETIC SENSOR AND ASSOCIATED METHODS

TECHNICAL FIELD

The present disclosure relates to the field of mobile wireless communications devices, and, more particularly, to mobile wireless communications having NFC sensors and magnetic sensors.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Some cellular devices incorporate contactless card technology and/or Near Field Communication chips. Near Field Communication technology is commonly used for contactless short-range communications based on radio frequency identification (RFID) standards, using magnetic field induction to enable communication between electronic devices, including mobile wireless communications devices. These short-range applications include payment and ticketing, electronic keys, identification, device set-up service and similar information sharing. This short-range high frequency wireless communication technology exchanges data between devices over a short distance, such as only a few centimeters.

In devices with multiple means of wireless communications, issues may sometimes arise when a signal intended for one wireless receiver is received and acted upon by another wireless receiver. This may lead to the device functioning in an undesired manner. As such, further advances in mobile wireless communications device technology are still needed.

DETAILED DESCRIPTION

Figure 1:
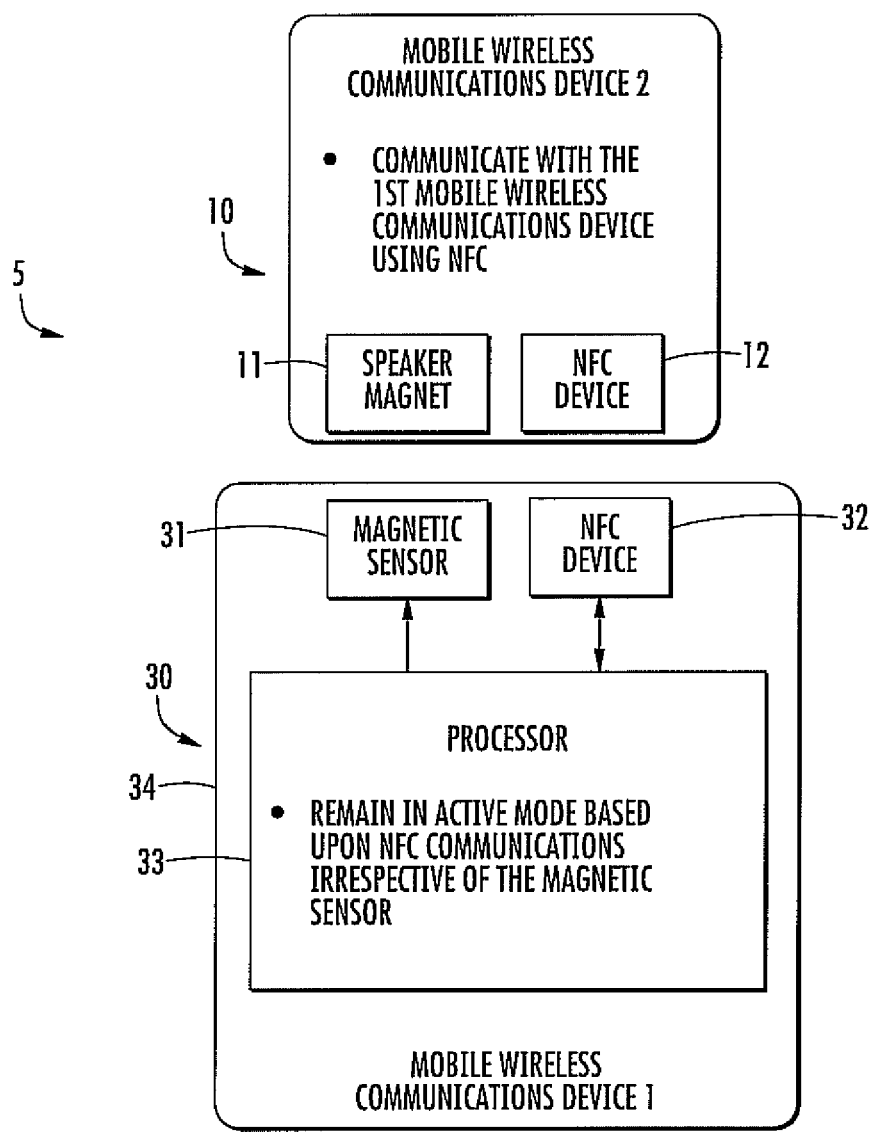
FIG. 1 is a block diagram showing a mobile wireless communications device of the present disclosure in proximity to and communicating with another mobile wireless communications device via near field communications (NFC).

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a mobile wireless communications device may include a near field communications (NFC) device, and a magnetic sensor. A processor may be coupled to the NFC device and the magnetic sensor, and may be switchable between an active mode and an idle mode based upon the magnetic sensor. The processor may be configured to remain in the active mode based upon communication via the NFC device irrespective of the magnetic sensor.

This mobile wireless communications device advantageously allows the processor to switch to the idle mode based upon the magnetic sensor detecting a magnetic source, such as when the mobile wireless communications device is placed into a holster having a magnet, while not inadvertently switching to the idle mode when "swiped" near another mobile wireless communications device (and thus, a magnet in the speaker of that device) to perform NFC communications.

As will be readily understood by those of skill in the art, the NFC device has a greater operating range than an operating range of the magnetic sensor. Therefore, the NFC device can detect NFC signals at a greater distance than the magnetic sensor can detect magnetic signals.

The magnetic sensor may be configured to generate an idle signal based upon detection of a magnetic source, and the processor may be switchable between the active mode and the idle mode based upon the idle signal. The processor may be configured to remain in the active mode based upon communication via the NFC device irrespective of idle signal.

In addition, a display may be coupled to the processor, and the processor may be configured to activate the display when in the active mode, and to deactivate the display when in the idle mode. The processor may be configured to operate according to a first device indication profile while in the active mode, and to operate according to a second device indication profile while in the idle mode.

Further, an input device may be coupled to the processor, and the processor may be configured to cooperate with the input device to perform at least one device function when in the active mode, and to ignore the input device when in the idle mode. The active mode may be a high power consumption mode, and the idle mode may be a low power consumption mode.

A portable housing may carry the NFC device, the magnetic sensor, and the processor. Additionally, a cellular transceiver may be coupled to the processor and configured to perform at least one cellular communications function.

A method aspect may be directed to a method of operating a mobile wireless communications device comprising a near field communications (NFC) device, a magnetic sensor, a processor coupled to the NFC device and the magnetic sensor, and being switchable between an active mode and an idle mode based upon the magnetic sensor. The method comprises causing the processor to remain in the active mode based upon communication via the NFC device irrespective of the magnetic sensor.

With initial reference to FIG. 1, a communications system 5 including a mobile wireless communications device 30 according to the present disclosure is now described. Here, the mobile wireless communications device 30 includes a portable hosing 34 carrying a processor 33 that is coupled to a magnetic sensor 31 and a NFC device 32. The processor 33 is switchable between an active mode and an idle mode. In some applications, the active mode is a high power consumption mode, and the idle mode is a low power consumption mode. As will be explained below, the active mode may include fully powering other components of the mobile wireless communications device 30, while the idle mode may include deactivating such components. Additionally, the active mode may include operating the processor 33 at a peak clock speed, while the idle mode may include operating the processor at a slower clock speed.

The magnetic sensor 31 may be a Hall effect sensor, for example, and is used to detect a magnetic source. A holster may be used to carry the mobile wireless communications device 30, and may include a permanent magnet therein. When mobile wireless communications device 30 is placed in the holster, and thus adjacent the permanent magnet, the magnetic sensor 31 senses the magnet, and the processor 30 then switches to the idle mode to conserve power.

With respect to the NFC device 32, Near Field Communication (NFC) technology is an extension of the ISO 14443 proximity-card standard as a contactless card, RF ID standard that incorporates the interface of a smart card and a reader into one device. A NFC device typically includes an NFC integrated circuit (IC) chip that communicates with both existing ISO 14443 smart cards and readers and other NFC devices and is compatible with any existing contactless infrastructure. The NFC IC chips use magnetic field induction where two loop antennas are located near each other and form an air-core transformer. The technology operates on the unlicensed radio frequency ISM band of about 13.56 MHz and has a bandwidth of about 2 MHz. The working distance is usually about 0 to 20 centimeters and a user of the NFC device touches another NEC device or tag to initiate communication, with data rates ranging from 106 to about 424 kbit/s. Further details are set forth in the Mobile NFC Technical Guidelines, Version 2.0, November 2007 by GSMA, the disclosure which is hereby incorporated by reference in its entirety.

The communications system 5 also includes a second mobile wireless communications device 10. This second mobile wireless communications device 10 includes a speaker having a magnet 11 therein, as well as a NFC device 12. The second mobile wireless communications device 10 is configured to communicate with the first mobile wireless communications device 30 via the NFC device 12.

Turning back to the first mobile wireless communications device 30, the processor 33 is configured to remain in the active mode based upon NFC communications irrespective of the magnetic sensor. Therefore, so long as the first mobile wireless communications device 30 is engaged in NFC communications with the second mobile wireless communications device 10, the processor 33 will not switch to the idle mode, despite the magnetic sensor 31 detecting a magnetic source (e.g. the magnet 11 in the speaker of the second mobile wireless communications device 10).

Since NFC communications take place with the participating devices in close proximity to each other, the design of the mobile wireless communications device 30 helps eliminate a situation where the magnetic sensor 31 detects the magnet 11 in the speaker of the second mobile wireless communications device 10, the processor 33 then mistakenly interprets this as meaning the device has been placed in a holster, and switches into the idle mode at an undesired time. Existing mobile wireless communications devices may be subject to such an issue, which would prove frustrating to a user.

Figure 2:
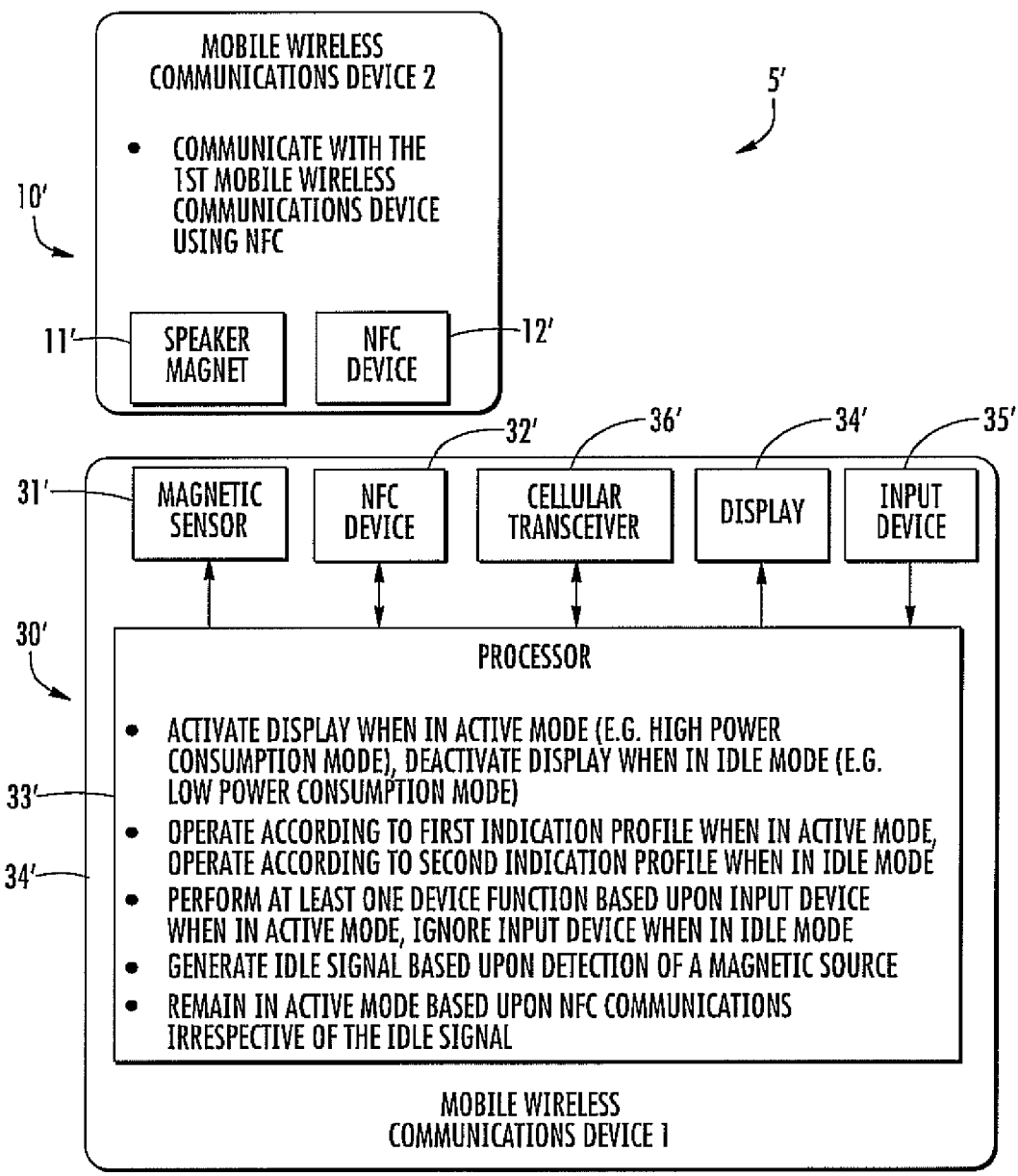
FIG. 2 is a more detailed block diagram showing a mobile wireless communications device of the present disclosure in proximity to and communicating with another mobile wireless communications device via near field communications (NFC).

With reference to FIG. 2, a more detailed embodiment of the communications system 5' is now described. Here, the first mobile wireless communications device 30' also includes a cellular transceiver 36', display 34', and input device 35' coupled to the processor 33'. The processor 33' is configured to cooperate with the cellular transceiver 36' for performing cellular communications, such as placing or receiving voice calls.

The display 34' may be a typical liquid crystal display (LCD) or organic light emitting diode display (OLED), as will be appreciated by those of skill in the art. The input device 35' may be formed from one device, such as a keypad, button, touch sensor, thumbwheel, or trackball, or may be formed from a plurality of such devices. In addition, the display 34' may be a touch sensitive display, and may function as all or part of the input device 35'.

Here, the processor 33' is configured to activate the display 34' when in the active mode, but to deactivate the display when in the idle mode. In addition, the processor 33' is configured to operate according to a first indication profile when in the active mode, and to operate according to a second indication profile when in the idle mode. An indication profile specifies how the mobile wireless communications device 30' indicates a user of incoming messages, e-mails, and voice calls. For example, an indication profile may specify that incoming voice calls are indicated by the playing of an audible ring tone, or that incoming voice calls are indicated by activation of a vibration unit. Further, the processor 33' may be configured to perform at least one device function based upon the input device 35' when in the active mode, but to ignore the input device when in the idle mode.

The switching of the processor 33' between the active mode and the idle mode proceeds similarly as described above with reference to the mobile wireless communications device 30. The magnetic sensor 31' cooperates with the processor 33' to generate an idle signal based upon detection of a magnetic source. The processor 33' is configured to remain in the active mode based upon NFC communications irrespective of the idle signal.

Figure 3:
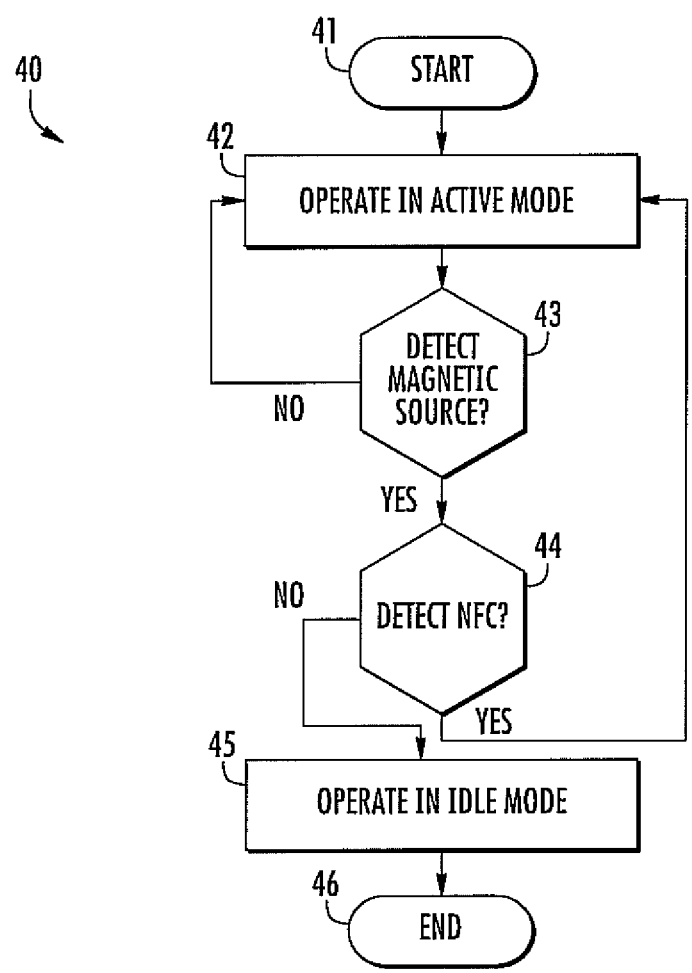
FIG. 3 is a flowchart illustrating a method of operating a mobile wireless communications device according to the present disclosure.

With reference to the flowchart 40 of FIG. 3, a method of operating the mobile wireless communications devices 30, 30' discussed above is now described. After the start (Block 41), the processor operates in the active mode (Block 42). At Block 43, if a magnetic source is detected, operation proceeds to Block 44. If a magnetic source is not detected, operation of the processor proceeds in the active mode as the method proceeds back to Block 42. If a magnetic source is detected, at Block 44, it is determined whether NFC communications are detected. If NFC communications are detected, then the method proceeds back to Block 42, and the processor continues operating in the active mode. If NFC communications are not detected, then the method proceeds to Block 45, and the processor switches to the idle mode. Block 46 indicates the end of the method.

Example components of a hand-held mobile wireless communications device 1000 that may be used in accordance with the present disclosure are further described in the example below with reference to FIG. 4. The device 1000 illustratively includes a housing 1200, a keypad 1400 and an output device 1600. The output device shown is a display 1600, which may comprise a full graphic LCD. In some example embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some example embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 4:
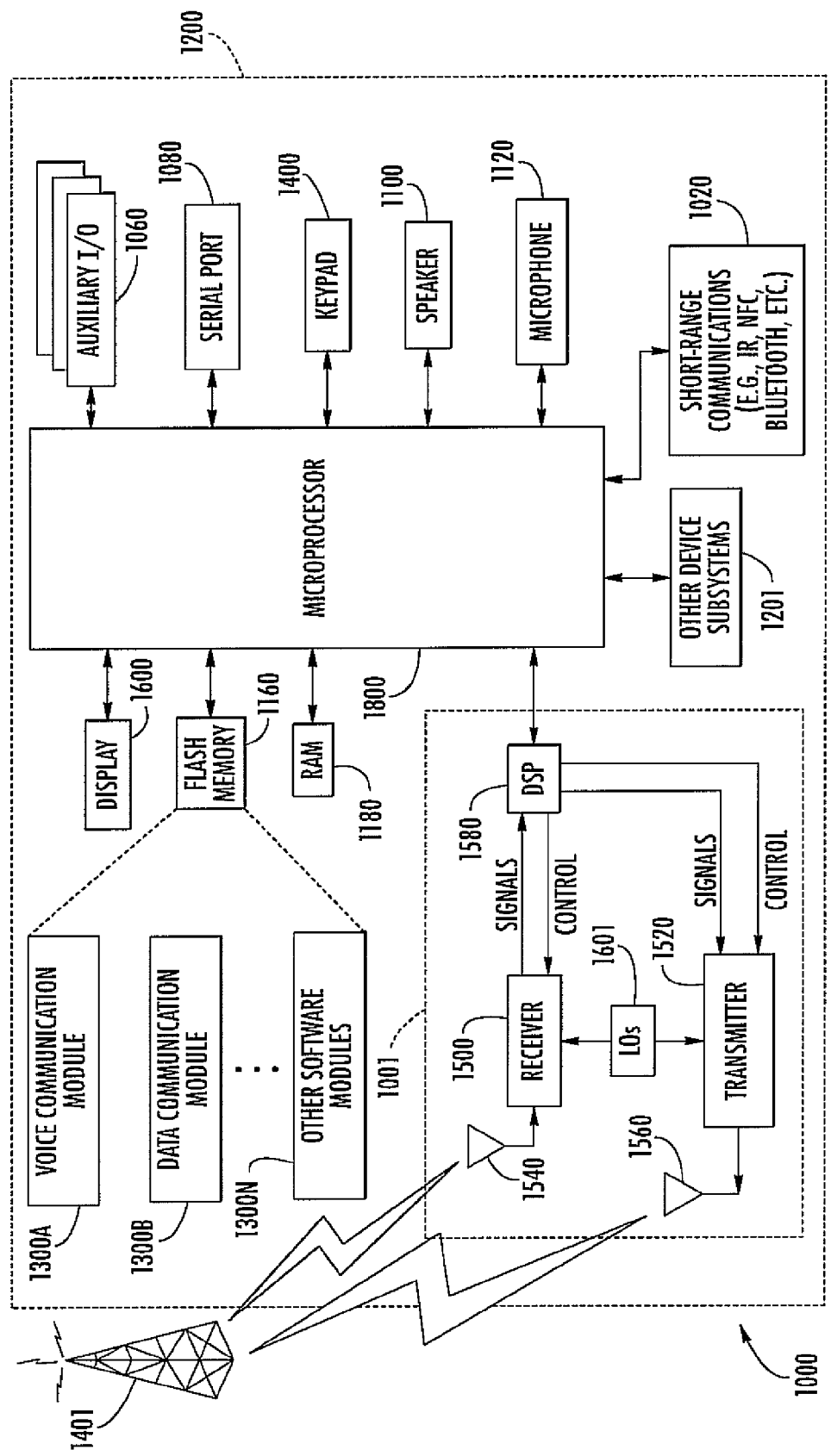
FIG. 4 is a schematic block diagram illustrating components of a mobile wireless communications device in accordance with an example embodiment of the present disclosure.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, COMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications That which is claimed is:

1. A mobile wireless communications device comprising:
a near field communications (NFC) device;
a magnetic sensor; and
a processor coupled to said NFC device and said magnetic sensor, and being switchable between an active mode and an idle mode based upon said magnetic sensor;
said processor configured to remain in the active mode based upon communication via said NFC device irrespective of said magnetic sensor.

2. The mobile wireless communications device of claim 1, wherein said NFC device has a greater operating range than an operating range of said magnetic sensor.

3. The mobile wireless communications device of claim 1, wherein said magnetic sensor is configured to generate an idle signal based upon detection of a magnetic source; wherein said processor is switchable between the active mode and the idle mode based upon the idle signal; and wherein said processor is configured to remain in the active mode based upon communication via said NFC device irrespective of idle signal.

4. The mobile wireless communications device of claim 1, further comprising a display coupled to said processor; and wherein said processor is configured to activate said display when in the active mode, and to deactivate said display when in the idle mode.

5. The mobile wireless communications device of claim 1, wherein said processor is configured to operate according to a first device indication profile while in the active mode, and to operate according to a second device indication profile while in the idle mode.

6. The mobile wireless communications device of claim 1, further comprising an input device coupled to said processor; and wherein said processor is configured to cooperate with said input device to perform at least one device function when in the active mode, and to ignore said input device when in the idle mode.

7. The mobile wireless communications device of claim 1, wherein the active mode is a high power consumption mode, and wherein the idle mode is a low power consumption mode.

8. The mobile wireless communications device of claim 1, further comprising a portable housing carrying said NFC device, said magnetic sensor, and said processor.

9. The mobile wireless communications device of claim 1, further comprising a cellular transceiver coupled to said processor and configured to perform at least one cellular communications function.

10. A mobile wireless communications device comprising:
a near field communications (NFC) device having an operating range;
a magnetic sensor having an operating range less than the operating range of said NFC device; and
a processor coupled to said NFC device and said magnetic sensor, and being switchable between an active mode and an idle mode based upon said magnetic sensor, the active mode being a high power consumption mode, the idle mode being a low power consumption mode;
said processor also configured to remain in the active mode based upon communication via said NFC device irrespective of said magnetic sensor.

11. The mobile wireless communications device of claim 10, further comprising a display coupled to said processor; and wherein said processor is configured to activate said display when in the active mode, and to deactivate said display when in the idle mode.

12. The mobile wireless communications device of claim 10, wherein said processor is configured to operate according to a first device indication profile while in the active mode, and to operate according to a second device indication profile while in the idle mode.

13. The mobile wireless communications device of claim 10, further comprising an input device coupled to said processor; and wherein said processor is configured to cooperate with said input device to perform at least one device function when in the active mode, and to ignore said input device when in the idle mode.

14. The mobile wireless communications device of claim 10, further comprising a cellular transceiver coupled to said processor and configured to perform at least one cellular communications function.

15. A method of operating a mobile wireless communications device comprising a near field communications (NFC) device, a magnetic sensor, a processor coupled to the NFC device and the magnetic sensor, and being switchable between an active mode and an idle mode based upon the magnetic sensor, the method comprising:
causing the processor to remain in the active mode based upon communication via the NFC device irrespective of the magnetic sensor.

16. The method of claim 15, wherein the NFC device has a greater operating range than an operating range of the magnetic sensor.

17. The method of claim 15, further comprising operating the processor to activate a display when in the active mode, and to deactivate the display when in the idle mode.

18. The method of claim 15, further comprising operating the processor according to a first device indication profile while in the active mode, and operating the processor according to a second device indication profile while in the idle mode.

19. The method of claim 15, further comprising operating the processor to cooperate with an input device to perform at least one device function when in the active mode, and to ignore the input device when in the idle mode.

20. The method of claim 15, wherein the active mode is a high power consumption mode, and wherein the idle mode is a low power consumption mode.

* * * * *